US008539778B2

(12) United States Patent
Hofhaus et al.

(10) Patent No.: US 8,539,778 B2
(45) Date of Patent: Sep. 24, 2013

(54) AIR FILTER HAVING A MOISTURE SENSOR FOR IDENTIFYING TYPE OF FILTER AND MOISTURE CONTENT AND METHOD OF USING FILTER IN A VEHICLE AIR CONDITIONING SYSTEM

(75) Inventors: Joern Hofhaus, Freising (DE); Gregor Wendrock, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 868 days.

(21) Appl. No.: 12/706,573

(22) Filed: Feb. 16, 2010

(65) Prior Publication Data

US 2010/0144262 A1  Jun. 10, 2010

Related U.S. Application Data (63) Continuation of application No. PCT/EP2009/003264, filed on May 7, 2009.

(30) Foreign Application Priority Data

May 8, 2008 (DE) .......................... 10 2008 022 630
Mar. 28, 2009 (WO) ................. PCT/EP2009/002291

(51) Int. Cl.
*F25D 3/12* (2006.01)

(52) U.S. Cl.
USPC ............................................... 62/56; 62/317

(58) Field of Classification Search
USPC ................ 62/176.1, 93, 150, 317, 56; 96/19; 454/75; 236/49.3, 91 D, 44 C
See application file for complete search history.

(56) References Cited

U.S. PATENT DOCUMENTS

| 4,752,855 | A | * | 6/1988 | Fedter et al. | .................. 361/286 |
| 4,917,293 | A | | 4/1990 | Fedter et al. | |
| 4,978,907 | A | * | 12/1990 | Smith | .......................... 324/72.5 |
| 5,656,767 | A | * | 8/1997 | Garvey et al. | ................ 73/61.44 |
| 5,793,645 | A | * | 8/1998 | Rump et al. | .................. 700/276 |
| 6,052,998 | A | | 4/2000 | Dage et al. | |
| 6,840,051 | B1 | | 1/2005 | Stein | |
| 6,894,620 | B2 | | 5/2005 | Reinhardt et al. | |

(Continued)

FOREIGN PATENT DOCUMENTS

| DE | 26 19 600 A1 | 11/1977 |
| DE | 35 17 481 A1 | 11/1986 |

(Continued)

OTHER PUBLICATIONS

Dubbel, Taschenbuch fuer den Maschlnenbau [Handbook for Mechanical Engineering], 20th edition, Springer Verlag, 2001. (Seven (7) pages).

(Continued)

Primary Examiner — Mohammad M Ali
(74) Attorney, Agent, or Firm — Crowell & Moring LLP (57) ABSTRACT

An air filter, which is intended for installation in an air conditioning system of a vehicle and which exhibits a moisture sensor, is disposed on or at the air filter. The moisture sensor is a component of an electric circuit section, which is arranged on or at the air filter. The moisture sensor is a capacitive sensor, whose capacitance depends on the moisture loading of the air, flowing around the sensor. At least one electric property of the electric circuit section represents the moisture loading on the air filter and the type of air filter.

23 Claims, 4 Drawing Sheets (56) References Cited

U.S. PATENT DOCUMENTS

| | | | |
|---|---|---|---|
| 7,077,004 B2* | 7/2006 | Mitter | 73/335.04 |
| 2002/0059912 A1* | 5/2002 | Bauer et al. | 123/198 E |
| 2003/0025598 A1* | 2/2003 | Wolf et al. | 340/457.4 |
| 2003/0076119 A1 | 4/2003 | Horz et al. | |
| 2006/0192570 A1 | 8/2006 | Dworatzek et al. | |
| 2006/0201120 A1 | 9/2006 | Wu et al. | |
| 2007/0151263 A1 | 7/2007 | Niemann et al. | |
| 2009/0211455 A1 | 8/2009 | Guenther et al. | |

FOREIGN PATENT DOCUMENTS

| | | |
|---|---|---|
| DE | 36 24 171 A1 | 1/1988 |
| DE | 40 00 164 A1 | 7/1991 |
| DE | 101 40 510 B4 | 2/2004 |
| DE | 102 45 911 A1 | 4/2004 |
| DE | 10 2005 016 393 A1 | 5/2006 |
| DE | 10 2005 042 406 A1 | 3/2007 |
| DE | 10 2007 056 356 A1 | 5/2009 |
| EP | 1 246 679 B1 | 10/2002 |
| EP | 1 806 249 A1 | 7/2007 |
| WO | WO 00/32298 A1 | 6/2000 |
| WO | WO 01/62529 A1 | 8/2001 |
| WO | WO 2007/004559 A1 | 1/2007 |
| WO | WO 2007/028461 A1 | 3/2007 |

OTHER PUBLICATIONS

Knittel, O et al., "Feuchtesensor fuer Klimaautomaten", ATZ Automobiltechnische Zeitschrift, Vieweg Publishing, Wiesbaden, De, vol. 102, Jan. 1, 2000, pp. 46-48. XP-001158935.
German Office Action dated Jan. 21, 2009 including English translation (Six (6) pages).
German Office Action dated Mar. 26, 2009 including English translation (Eight (8) pages).
International Search Report dated Jul. 21, 2009 including English translation (Four (4) pages).
International Search Report dated Oct. 16, 2009 including English translation (Ten (10) pages).

* cited by examiner

AIR FILTER HAVING A MOISTURE SENSOR FOR IDENTIFYING TYPE OF FILTER AND MOISTURE CONTENT AND METHOD OF USING FILTER IN A VEHICLE AIR CONDITIONING SYSTEM

CROSS-REFERENCE TO RELATED APPLICATIONS

This application is a continuation of PCT International Application No. PCT/EP2009/003264, filed May 7, 2009, which claims priority to PCT International Application No. PCT/EP2009/002291, filed Mar. 28, 2009, and to German Patent Application No. DE 10 2008 022 630.0-16, filed May 8, 2008, the entire disclosures of which are herein expressly incorporated by reference.

BACKGROUND AND SUMMARY OF THE INVENTION

The present invention relates to an air filter, which is intended for installation in an air conditioning system of a vehicle, as well as a vehicle air conditioning system and a method for operating the vehicle air conditioning system.

The relevant background art includes DE 10 2005 042 406 A1, DE 36 24 171 A1, U.S. Pat. No. 6,840,051 B1, DE 40 00 164 A1, WO 2000 032298 A1, EP 18 06 249 A1 and the U.S. Pat. No. 6,052,998 A.

Furthermore, German patent application DE 10 2007 056 356.8 (not published earlier) describes a method for controlling a vehicle air conditioning system, in which a measure for the amount of intake water at the fresh air intake port of the air conditioning system of a vehicle is determined as a function of a sensor signal. For example, the signal of a rain sensor, mounted in the mirror area of the windshield, is used as the sensor signal. It is self-evident that the rain sensor measures the amount of water that is in the sensor area of the windshield, but not exactly the amount of water and/or moisture that is present in the intake area of the air conditioning system. The air conditioning system is controlled as a function of the amount of water, determined by the rain sensor such that the amount of intake air flowing through the fresh air intake port is reduced.

EP 1 246 679 B1 describes an air filter element, on which is mounted a chip, including an integrated moisture sensor.

DE 35 17 481 describes a method for maintaining the effectiveness of chemisorption compositions of filters for motor vehicle cabs. In this case, a filter element is used, on which a moisture sensor is mounted. A heating device is switched on or off as a function of the signal, delivered by the moisture sensor.

WO 2007/028461 A1 discloses a filter arrangement, in which a moisture sensor is fastened on a receptacle of the filter element. The moisture sensor measures the air humidity of the fluid, flowing through the filter element.

DE 102 45 911 A1 describes an optical sensor device by which the moisture loading of a filter element can be measured.

DE 101 40 510 B4 describes a filter arrangement including a sensor, which is mounted on the filter and by which the air velocity of the air, flowing through the filter, and, thus, indirectly the loading of the filter element, can be measured.

In most vehicles the fresh air intake of the heating and cooling system occurs almost exclusively by way of a gap between the engine hood and the windshield. In the event of heavy rain or from driving through a carwash, a considerable amount of water can penetrate into the area in which the air conditioning system of the vehicle takes in its fresh air. Suitable technical measures are to be employed for the purpose of preventing the penetrating water from flowing through the air conditioning system and into the passenger compartment.

There is needed, however, an air filter, which is intended for an air conditioning system of a vehicle and which is made in such a way that it is possible to control and/or regulate as precisely as possible the air conditioning system of the vehicle as a function of the moisture contained in the intake air and/or in the intake tract of the air conditioning system of the vehicle. Additionally, a method is needed, which is intended for operating an air conditioning system of a vehicle, that considers the type of air filter that is incorporated.

These and other needs are met by the features of the present invention. Other embodiments and further developments of the invention are also described herein.

The starting point of the invention can be, for example, the aforementioned older German patent application DE 10 2007 056 356.8, (not published earlier) which has already been cited above. In this case, the amount of (fresh) intake air from the air conditioning system is regulated as a function of a sensor signal, which correlates quite well at least to some extent with the moisture loading of the intake air from the air conditioning system. The entire disclosure of DE 10 2007 056 356.8 is herein expressly incorporated by reference herein.

An embodiment of the invention consists of an air filter, which is intended for installation in an air conditioning system of a vehicle and which includes a moisture sensor, which is disposed on and/or at the air filter. In this context the moisture sensor is a component of an "electric circuit section," which is arranged on and/or at the air filter.

The term "moisture sensor" should be given a broad interpretation. It is commonly defined as a measuring device, which detects the presence of fluids, that is, water, or other fluids or gas and generates a measurement signal, which corresponds to, or is indicative of, the fluid concentration or correlates at least to the fluid concentration.

Mounting the moisture sensor on the filter is advantageous because an additional holder for the sensor can be dispensed with, and the sensor can be positioned in an advantageous manner, for example, in the middle of the air stream. Relatively low flow rates prevail directly at the filter owing to the large surface, so that undesired sound effects are largely avoided by a sensor that is positioned in the air stream.

The aforementioned term "electric circuit section" should be given a broad interpretation. It can be defined, for example, as an open electric circuit in the sense of a circuit section or a closed electric circuit, in particular, an oscillating circuit, that is, an electric circuit, which exhibits an ohmic resistance, a capacitive resistance and an inductive resistance. Instead of the term electric circuit section, one of the even more general terms "electric circuit," "circuit arrangement," "circuit section" or the like could also be used. The term "electric circuit section" can be very loosely defined as an electrically conductive arrangement, which contains the moisture sensor or is formed by the moisture sensor. The electric circuit section can be formed, in particular, by an integrated circuit or can contain an integrated circuit.

The moisture sensor, according to the invention, can be, for example, a capacitive sensor. The term capacitive sensor should also be given a broad interpretation. What is meant is that the moisture sensor contains a component or is formed by a component, whose capacitance depends on the moisture loading of the air, flowing around said component, and, thus, is suitable as a "measuring device." The moisture sensor can be formed by an electric oscillating circuit, the capacitive component of which changes as a function of a change in the fluid loading of the air surrounding the moisture sensor.

One important aspect of the invention may be deemed to be that at least one "electric property" of the electric circuit section, in particular, an "electric property" which is permanently implemented in the electric circuit section, represents the type of air filter. The term "electric property" should be given a very broad interpretation. In principle, it can be any directly or indirectly measurable and/or determinable electric and/or electromagnetic property or the "magnitude of an electric or electromagnetic property." This can include, for example, the frequency response of the electric circuit section, the amplitude response of the electric circuit section on traversing the frequency band, in particular a natural frequency of the electric circuit section, an ohmic resistance, an inductive and/or capacitive resistance, a corresponding resistance range, the total alternating circuit resistance of the electric circuit section, and/or a corresponding total alternating circuit resistance range, etc.

The subject matter of the invention is, in particular, also a "filter set," formed by two or more air filters. In this case, the individual air filters are suitable in terms of design and functionality for installation in a type of air conditioning system for a vehicle. The air filters of a filter set and/or a filter module differ, for example, with respect to their filter properties (micro filter, pollen filter, bacteria filter, etc.). Since each of the individual types of air filters of an air filter module is assigned a predefined electric property and/or a magnitude of a predefined electric property, there is the option of an "automatic identification" of the actual air filter, incorporated into the air conditioning system, by the air conditioning system electronics and/or the electronics of the electrical system of the vehicle.

Preferably, the filter type is "coded" by means of the natural frequency of the electric circuit section and/or the moisture sensor. By determining the natural frequency and/or the magnitude of the natural frequency of an electric circuit, which contains the electric circuit section and, thus, the moisture sensor and/or is formed by the electric circuit section and/or the moisture sensor, the type of air filter can be determined.

According to a further development of the invention, a particular type of air filter is assigned a predefined "value range," in which the electric property of its electric circuit section may lie. The range of values is selected preferably in such a manner that the variations in the "electric property" of the electric circuit section that occur when the air filter is operating under normal conditions and that may occur as a consequence of changes in the moisture loading of the air, flowing around the air filter, lie within the predetermined range of values.

Therefore, when the air filter is installed in an air conditioning system of a vehicle, there is the possibility of detecting "automatically" the type of incorporated air filter by way of the electronics of the air conditioning system. Thus, it can be determined, for example, whether an original filter of the automaker and/or an air filter, which is technically released to the public by the automaker, is incorporated. In particular, it can also be detected, whether an air filter is incorporated that the vehicle electronics does not know and whose quality is, therefore, dubious. On recognition of a filter, which was not released by the automaker, by the electronics of the vehicle electrical system or the air conditioning system, a corresponding warning and/or error message can be generated in the vehicle and sent visually to the driver, for example, over a display, a warning light or the like, and/or acoustically by a voice message.

According to a further development of the invention, the moisture sensor exhibits an electric oscillating circuit, whose capacitance and/or whose capacitive resistance change (changes) as a function of the changes in the moisture loading of the surrounding air. Owing to this variation and in consideration of the remaining parameters of the oscillating circuit (ohmic and inductive component), the result is a corresponding dependency of the natural frequency of the moisture sensor system on the air humidity.

The natural frequency of the electric circuit section, containing the moisture sensor, and/or the natural frequency of an evaluating electric circuit, which contains the electric circuit section, can be output directly as the output signal for further evaluation and determination of the air humidity in and/or at the air filter.

Furthermore, the general magnitude of the frequency range is divided into non-overlapping frequency ranges through a suitable selection of the sizes of the oscillating circuit in order to make possible and perform a classification of the various types of filters and, thus, the corresponding influences on the control system as a function of the filter type and the air humidity in the sensor.

The air filter can be installed in an air duct of the air conditioning system of the vehicle. The moisture loading of the air flowing through the filter and/or the moisture loading of the air filter can be measured directly by use of the moisture sensor. It can be provided that the moisture sensor is used primarily for detecting the intake water in liquid form, as compared to the sensors, known from the state of the art.

Preferably, the moisture sensor is arranged upstream with respect to the air filter. "Upstream" means on the "pressure side" of the air filter, that is, on that side of the air filter, against which the air from the blower flows in the state of the air filter built into the air conditioning system of the vehicle. An arrangement of a moisture sensor "downstream," as is mentioned, for example, in DE 10 2005 042 406 A1, is regarded to be more disadvantageous, because the air filter retains at least to some extent the water, which is contained in the air stream in the liquid state. In contrast, an upstream arrangement of the moisture sensor has the advantage that water droplets, which are eventually sucked in, will be sucked in first through the blower and atomized as a consequence of the high shear forces and turbulence prevailing in the blower. The result is that the air coming from the blower becomes suddenly wetter not only locally, but also over almost the whole flow width of the air duct and, thus, the air filter.

If the moisture loading exceeds a value, which is regarded as critical, then the electronics can control and/or regulate one or more functional parameter(s) of the air conditioning system of the vehicle in such a manner that the moisture, which is introduced into the passenger compartment by the air conditioning system by way of the air conveyed into the passenger compartment is limited and/or reduced. Thus, for example, the amount of fresh intake air can be controlled and/or regulated as a function of the (moisture) signal delivered by the moisture sensor. If the moisture sensor measures a high moisture value, then it can be provided that the volumetric flow of fresh intake air is reduced.

The dew point of the intake air can be determined by the moisture signal, delivered by the moisture sensor, using the electronics. The air conditioning system of the vehicle can be regulated and/or controlled by the electronics as a function of the determined dew point such that a fogging of the windshield of the passenger compartment is avoided. Thus, the "fogging sensor," which is provided in conventional vehicle air conditioning systems for this purpose, could be eliminated.

Furthermore, an important advantage of the invention may also be seen in the fact that with comparatively simple and cost effective "design features," "an inrush of water" into the air duct system of the air conditioning system of the vehicle can be detected very reliably and fast. Another advantage of the invention may be seen in the fact that with these very simple design measures a low flow resistance can be achieved. Thus, when the blower output is specified, it is possible to achieve a higher volumetric air flow and, thus, better efficiency.

Preferably, the volumetric flow of fresh intake air is reduced precisely when the moisture at the moisture sensor exceeds a predefined limit value, for example, when extremely large amounts of moisture and/or water are sensed, for example, during a sudden downpour or while driving through a carwash. The limit value does not have to be necessarily a fixed predetermined value. Rather, the limit value can be determined by the electronics from a limit value function and/or from a group of curves, which in turn can depend on a variety of parameters such as the outside temperature, the vehicle speed, etc.

According to a further development of the invention, the air filter and/or the connections of the electric circuit section are designed such that the air filter can be built into the air conditioning system of the vehicle only in such a way that the moisture sensor is arranged upstream with respect to the air filter. This feature can be achieved, for example, by a suitable design of a frame element of the air filter that envisions an unambiguous geometric configuration and allows an installation only when the air filter is correctly oriented, for example, with respect to a flow duct of the air conditioning system. It is also contemplated that the electric connections of the electric circuit section, which are provided for connecting to the electronic system of the vehicle, are arranged spatially such that an electrical connection is made possible only with the proper orientation of the air filter. If the electric circuit section is connected to the electronic system of the vehicle by means of one or more electric line(s) and/or cable(s), then the length of the lines and/or cables can be dimensioned such that an electric connection is possible only if the air filter is in correct alignment.

The moisture sensor can be a sensor, which measures directly the water loading of the air, flowing through the filter, and/or the water loading of the filter. The sensor can also be, for example, an electric sensor, whose electric resistance and/or whose conductivity change (changes) as a function of the (air) humidity.

However, it is preferably a capacitive sensor, which is based on the fact that the capacitance changes as a function of the moisture present at the sensor. The "core" of such a sensor can be a "capacitor" with a dielectric that can be formed by a ceramic element, for example, in the form of a chip, which changes the capacitance of the capacitor as a function of the moisture loading. The ceramic element can be heated by means of a heating device, for example, an electric heater. Such a heating device can dry in a targeted manner the moisture sensor, a feature that has the advantage that, after the moisture has been dragged in, the moisture sensor can be returned relatively quickly again into a ready-to-use state.

In principle, however, other kinds of sensors, for example, optical sensors, are also suitable.

As stated above, the filter element can be "coded." In this context, "coded" means that the type of incorporated air filter can be recognized by the electronics, so that the electronics can recognize, for example, whether it is a particle filter that has been incorporated or a combination filter, a fine dust filter or any other type of filter.

The type of filter can be "detected" by the electronics in many ways. As an alternative to the aforementioned methods, the filter type can also be determined by the electronics using an optoelectronic method. It is contemplated, for example, that an optical sensor scans a barcode, provided on the air filter, or the geometry and/or specific subareas of the geometry of the filter element.

As an alternative to the aforesaid, the line resistance and/or the conductance of the moisture sensor, disposed on and/or at the air filter, could be measured, and in this way the filter type could be detected. Thus, for example, it could be provided that a particle filter is equipped with a moisture sensor, which exhibits a line resistance in a range of x ohms (for example, 100 ohms), a combination filter is equipped with a moisture sensor, which exhibits a line resistance in a range of y ohms (for example, 200 ohms), and a fine dust filter is equipped with a moisture sensor, which exhibits a line resistance in a range of z ohms (for example, 300 ohms).

If one assumes that, as a consequence of the moisture variations, the resistance of the moisture sensor can vary in a bandwidth of, for example, 50 ohms, then the electronics can recognize the filter type by the magnitude of the total resistance of the "moisture sensor electric circuit."

The "inrush of water" into the air conditioning system will become apparent in a comparatively significant and sudden change in the signal, delivered by the moisture sensor. In order to be able to distinguish between the normal variation in the air humidity and the inrush of water, it can be provided that, in addition to the absolute value of the signal, delivered by the moisture sensor, the signal gradient (that is, the temporal derivation of the signal) and/or an approximated signal gradient is (are) monitored by the electronics, that is, how intense is the rise and/or fall of the signal over time.

According to a further development of the invention, the air duct system exhibits a "blower," for example, a fan wheel, which is integrated into the air duct system and/or is disposed therein. The air filter can be arranged "upstream," that is, when viewed in the flow direction of the air, in front of the blower, or downstream, that is, when viewed in the flow direction of the air, following the blower.

If the air filter is arranged upstream, then the water droplets, penetrating into the air duct system, are atomized into ultrafine water droplets by the blower, a feature that has the advantage that the moisture sensor can register the penetration of moisture into the air duct system with hardly any delay. If the air filter were to be arranged upstream of the blower, then a penetrating water droplet would have to strike the moisture sensor, a feature that can be linked to a certain "dead time" until the registration of the inrush of water.

An especially simple and cost effective option for making a moisture sensor is a metal wire or a flat metal strip to be attached, for example, to a frame of the filter element. As an alternative, a metal wire could also be integrated into the frame of the filter element or directly into the filter material. The material, from which the wire and/or the strip is made, can be, for example, copper or an alloy of various metals. The electric conductor, forming the moisture sensor, can be connected to the electrical system and/or the electronics of the vehicle by means of, for example, electric contacts or by means of a plug.

In summary the invention achieves, in particular, the following advantages:

(1) By means of the moisture sensor, which is mounted directly on and/or at the air filter, the moisture, contained in the intake air, and/or the water, contained in the intake air, can be detected directly and, thus, very reliably.

(2) Since the moisture sensor can be mounted directly on and/or at the air filter, there is no need for a separate holder and/or fastener for the moisture sensor.

(3) The filter type can be coded by means of the electric circuit of the moisture sensor and, thus, can be recognized by the electronics. As a function of the detected filter type, an operating map, stored in the electronics, and/or a corresponding operating strategy can be selected.

(4) As a function of the detected filter type, servicing intervals can be set automatically correctly.

(5) By means of the electronics it can, therefore, also be recognized whether a filter has been incorporated at all and/or whether eventually a filter was incorporated that does not exhibit a moisture sensor that the electronics "knows" and, thus, may cause problems in the air conditioning system of the vehicle. The installation of a filter, and the installation of the filter intended by the manufacturer for the air conditioning system of the vehicle, is important, because only a really suitable filter can reliably protect the evaporator of the air conditioning system from dirt, fibers, particles or copper dust from the blower motor collectors from being dragged in to the system. Only with a "fitting" filter can the growth and/or accumulation of bacteria and/or fungi on the evaporator and, thus, the odor generation be effectively prevented and/or at least slowed down. In addition, the evaporator is better protected against extraneous particles being dragged in and, thus, also protected against the associated risk of corrosion. However, the installation of an air filter, intended by the automaker, offers not only an advantage for the customer, but also for the automaker, because it is in the best interest of both sides to avoid as much as possible repair and warranty costs.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
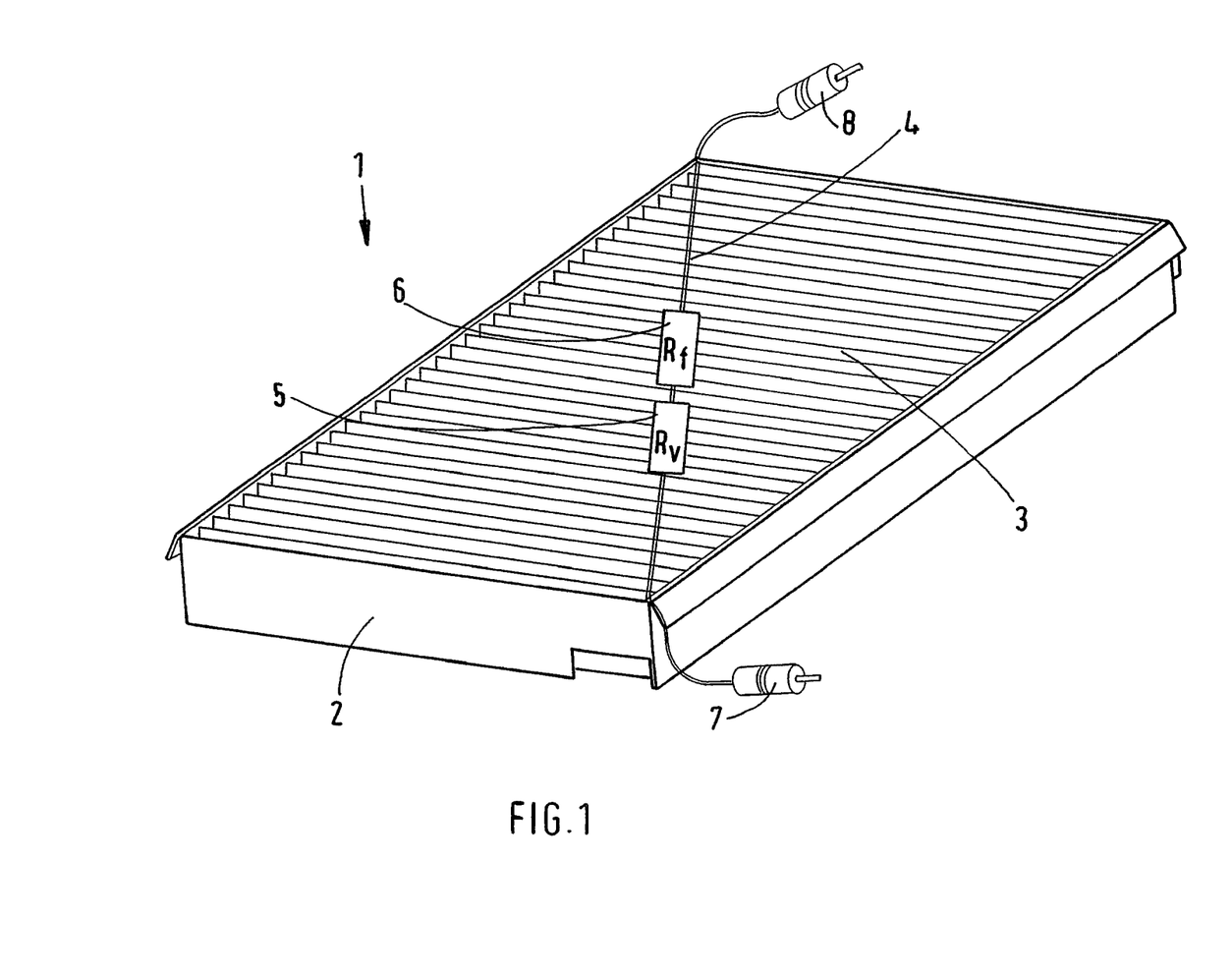
FIG. 1 depicts a first embodiment of an air filter of a vehicle air conditioning system according to the invention.

FIG. 1 shows an air filter 1, which can be inserted into an air duct, in particular into a fresh air intake duct of a vehicle air conditioning system, which is not shown in detail herein. In the embodiment illustrated herein, the air filter 1 has an essentially rectangular filter frame 2 that is made of a synthetic plastic material, and a filter fabric 3, which is folded in zig-zag folds.

In the embodiment that is illustrated herein, a "diagnostic cable" 4 extends diagonally across the filter frame 2, that is, from one corner of the filter frame 2 to a diagonally opposite corner of the filter frame 2. A series resistor 5 and a moisture dependent resistor 6 are integrated into the diagnostic cable. The series resistor 5 defines a "resistance offset," that is, the order of magnitude, in which the total resistance of the diagnostic cable 4 lies. Hence, with the aid of the size of the series resistor 5 or with the aid of the size of the total resistance of the "diagnostic electric circuit," which is determined basically by the series resistor 5, the electronics can detect the current type of filter, a feature that is explained in even more detail with reference to FIG. 4. In the case of the series connection of the two resistors 5, 6, shown in FIG. 1, the total resistance is the product of the sum of both resistances. Thus, the total resistance depends on the moisture loading at the resistor 6.

In the embodiment, shown in FIG. 1, the diagnostic cable 4 is connected to an evaluating electronic device, which is not illustrated in detail herein, by way of two assigned plugs 7, 8.

Figure 2:
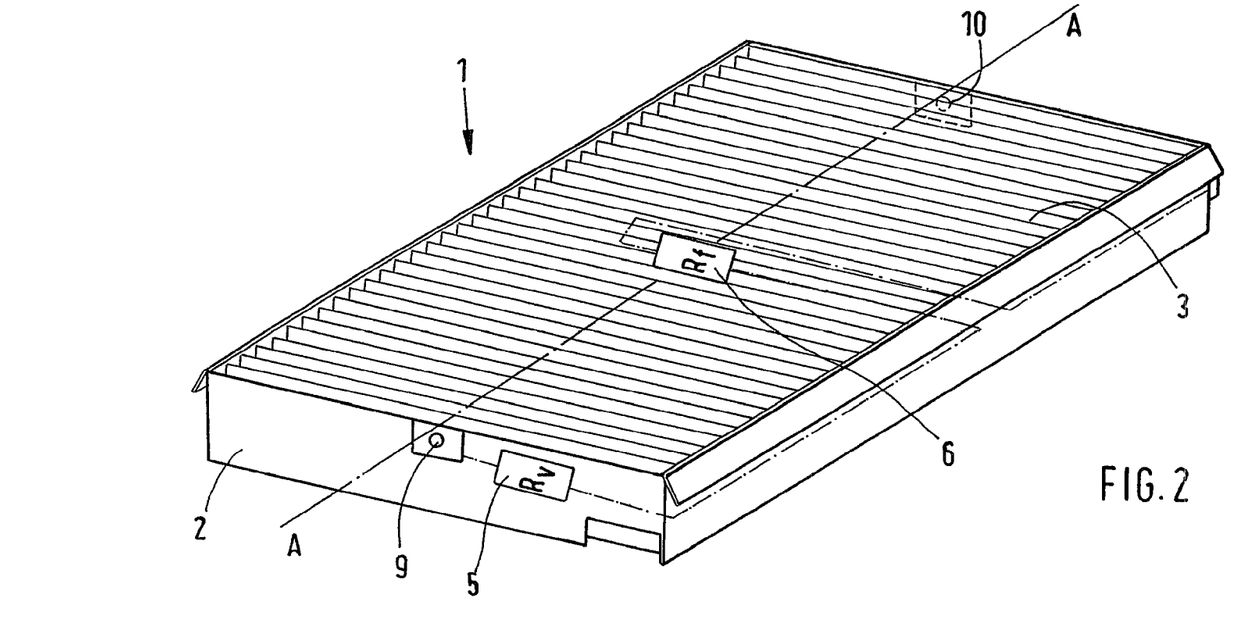
FIGS. 2 and 3 depict a second embodiment.
Figure 3:
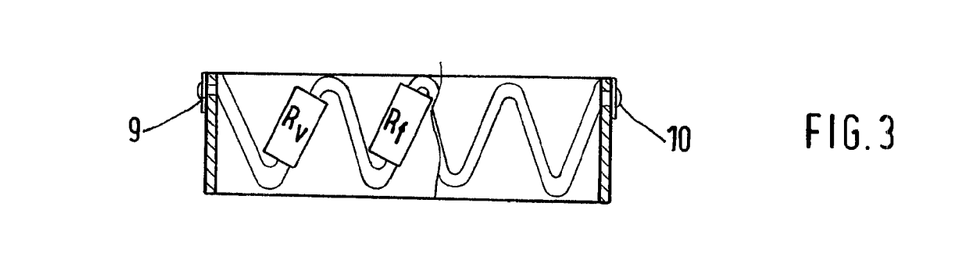

FIGS. 2 and 3 show a variant of the embodiment in FIG. 1. Instead of using plugs, the series connection, formed by the two resistors 5, 6, is connected electrically to the evaluating electronic device by way of contacts or terminals 9, 10, which are provided laterally on the frame 2 of the air filter 1.

The "diagnostic cable" can be formed, for example, by use of a copper wire or foil, which is mounted on the filter frame 2 or is integrated into the filter frame 2 and/or into the filter fabric 3.

Figure 4:
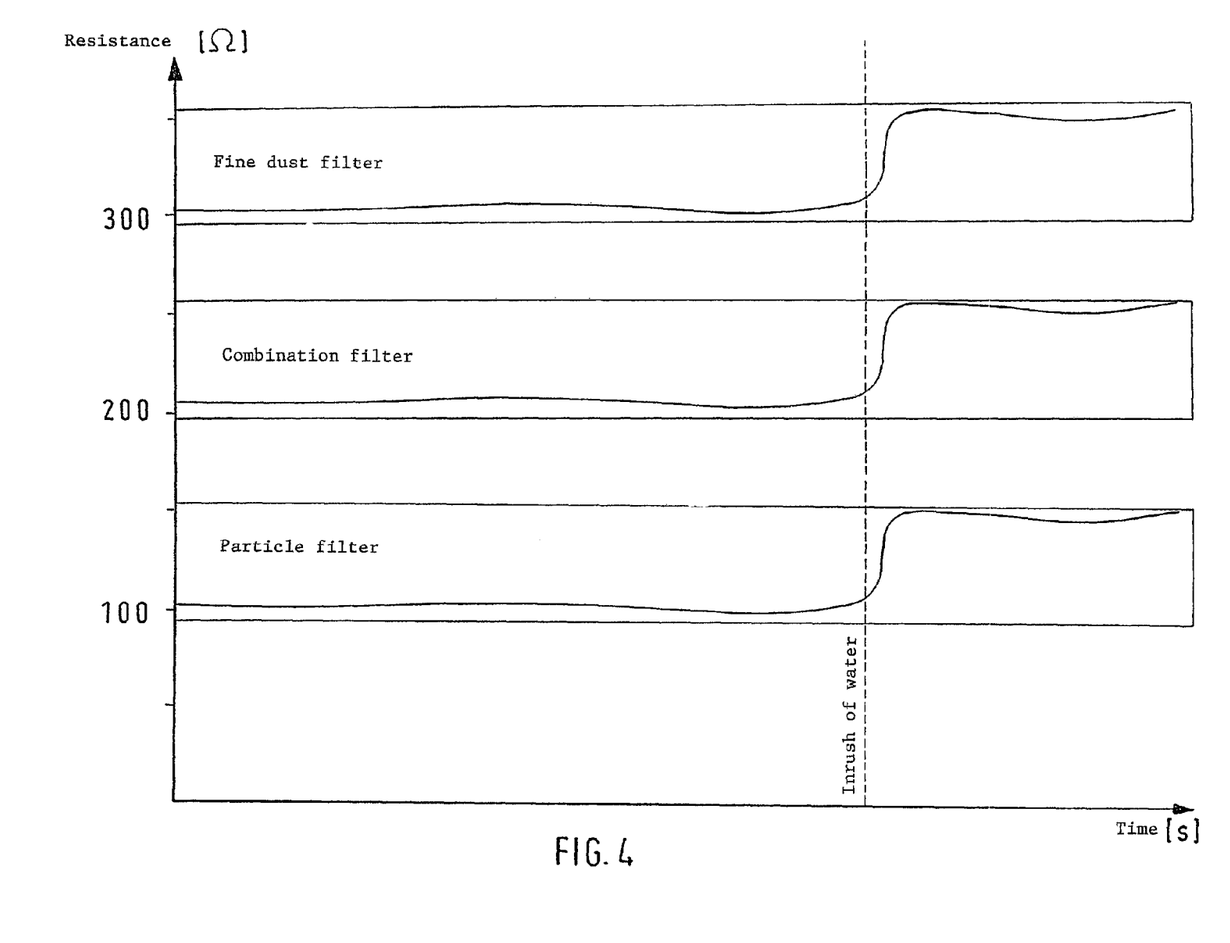
FIG. 4 illustrates the basic principle for detecting the incorporated filter type.

FIG. 4 describes how various types of filters can be coded by way of the resistance of the moisture sensor arrangement. For example, it can be provided that the electric resistance for a first filter type (for example, a particle filter) at very low moisture loading lies in a range of 100 ohms and at maximum moisture loading in a range of 150 ohms. If the evaluating electronic device detects a total sensor resistance in a range between 100 and 150 ohms, then the conclusion can be drawn that a particle filter was incorporated. Correspondingly, a combination filter and a fine dust filter can be coded, for example, by means of the value ranges of 200 ohms up to 250 ohms and/or 300 ohms and 350 ohms.

In addition, it can be provided that the evaluating electronic device measures not only the total resistance of the sensor arrangement that is present at a specific moment, but also the gradient of the sensor signal, that is, the time rate of change of the resistance. In the event of a steep gradient, it can be concluded that precisely at this moment there is "an inrush of water" or that the inrush of water has just ended.

Figure 5:
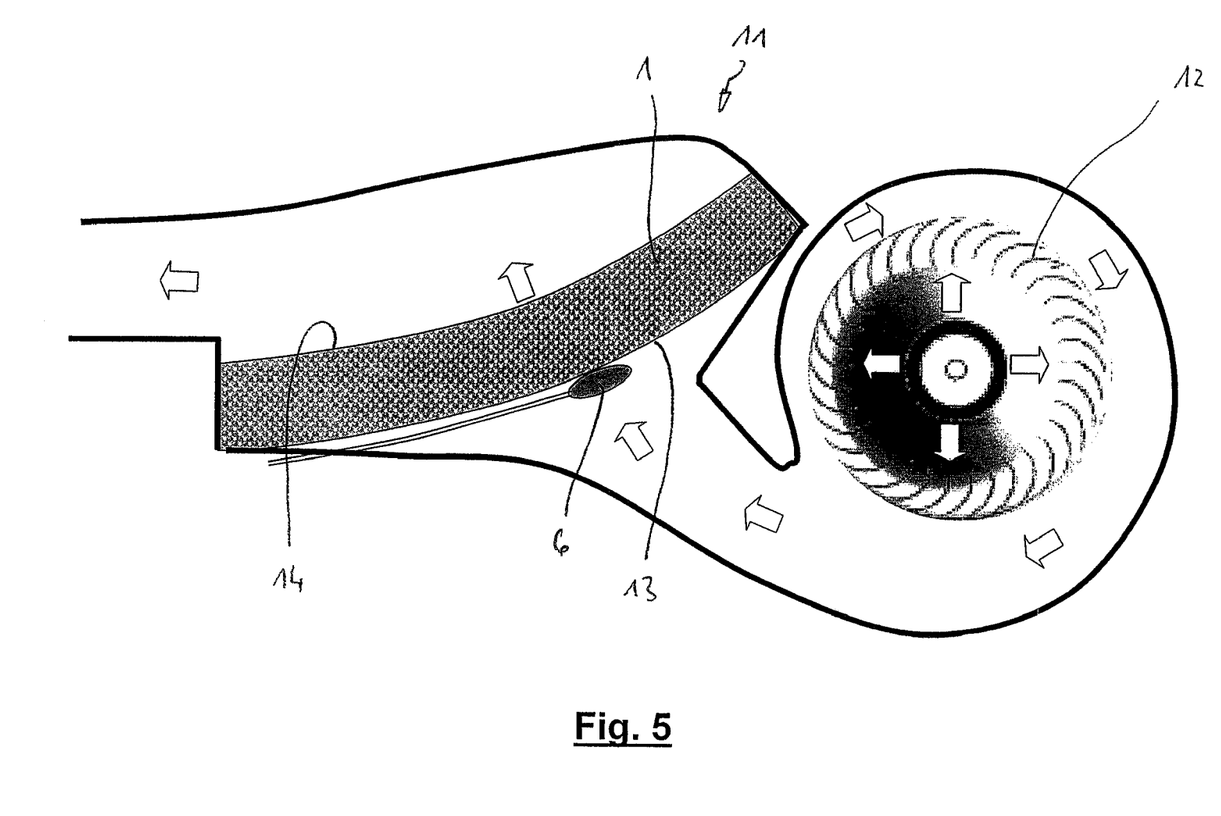
FIG. 5 is a drawing illustrating the upstream arrangement of the moisture sensor.

FIG. 5 shows a cross section of the flow duct 11 of an air conditioning system of a vehicle. The flow duct arrangement has a blower 12, which sucks in air, in particular atmospheric air, and blows and/or conveys it in the direction of the air filter 1, which is also disposed in the flow duct arrangement. The air filter 1 has an "upstream side" 13 and a "downstream side" 14. The moisture sensor 6 is disposed on the upstream side 13 of the air filter 1, that is, on the "pressure side," or on the side of the air filter 1 that faces the blower 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An air filter for use in an air conditioning system of a vehicle, comprising:
   an electric circuit section located at least one of on the air filter and in close proximity to said air filter, said electric circuit section including a moisture sensor; and
   wherein the electric circuit section includes at least one electric property representative of a moisture loading on the air filter and a type of the air filter, wherein the type of the air filter is assigned a predefined range of values, said at least one electric property of the electric circuit section being within the predefined range of values.

2. The air filter according to claim 1, wherein the moisture sensor is a capacitive sensor having a capacitance dependent on moisture loading of air that at least one of flows around and surrounds the moisture sensor.

3. The air filter according to claim 1, wherein said predefined range of values are defined such that variations in the electric property of the electric circuit section occurring when the air filter operates under normal conditions are within the predetermined range of values.

4. The air filter according to claim 3, wherein the predefined range of values include at least one of a frequency range and an amplitude range at a predefined frequency range.

5. The air filter according to claim 1, wherein said at least one electric property is at least one of:
 a magnitude of a natural frequency of the electric circuit section;
 an ohmic resistance;
 an inductive resistance; and
 a capacitive resistance, of the electric circuit section.

6. The air filter according to claim 1, wherein the moisture sensor includes a ceramic element as a dielectric.

7. The air filter according to claim 1, further comprising a heater operatively configured to at least one of heat and dry the moist sensor.

8. A vehicle air conditioning system, comprising:
 an air filter operatively installed in the vehicle air conditioning system;
 an electric circuit section located at least one of on the air filter and in close proximity to said air filter, said electric circuit section including a moisture sensor; and
 wherein the electric circuit section includes at least one electric property representative of a moisture loading on the air filter and a type of the air filter, wherein the type of the air filter is assigned a predefined range of values, said at least one electric property of the electric circuit section being within the predefined range of values.

9. The vehicle air conditioning system according to claim 8, wherein the moisture sensor outputs a signal indicative of moisture loading of the air filter.

10. The vehicle air conditioning system according to claim 9, wherein at least one functional parameter of the vehicle air conditioning system is controlled and/or regulated as a function of the output signal indicative of the moisture loading of the air filter.

11. The vehicle air conditioning system according to claim 10, wherein at least one functional parameter of the vehicle air conditioning system is controlled and/or regulated as a function of the type of the air filter determined by the magnitude of the determined natural frequency.

12. The vehicle air conditioning system according to claim 9, wherein a plurality of operating states of the vehicle air conditioning system, an electronic device coupled to the electric circuit section controls and/or regulates a volumetric flow of intake fresh air for the air conditioning system as a function of the output signal indicative of the moisture loading of the air filter.

13. The vehicle air conditioning system according to claim 9, wherein in an electronic device coupled with the electric circuit section controls and/or regulates at least one functional parameter of the vehicle air conditioning system as a function of a time rate of change of the output signal indicative of the moisture loading of the air filter.

14. The vehicle air conditioning system according to claim 13, wherein the time rate of change of the output signal is a gradient of the output signal delivered by the moisture sensor.

15. The vehicle air conditioning system according to claim 8, further comprising:
 an electronic device disposed outside of the air filter, the electronic device being coupled with the electric circuit section;
 wherein the electronic device is operatively configured to determine a natural frequency of the electric circuit section and/or a natural frequency of an electric circuit comprising the electric circuit section, the electric circuit being disposed at least one of on said air filter and in close proximity to the air filter; and
 wherein the electronic device determines the type of air filter as a function of a magnitude of the determined natural frequency.

16. The vehicle air conditioning system according to claim 15, wherein the moisture sensor is operatively disposed upstream with respect to the air filter.

17. The vehicle air conditioning system according to claim 16, wherein at least one of the air filter and connections of the electric circuit section are operatively configured such that the air filter is installable in the vehicle air conditioning system only so that the moisture sensor is disposed upstream with respect to the air filter.

18. The vehicle air conditioning system according to claim 15, wherein at least one functional parameter of the vehicle air conditioning system is controlled and/or regulated as a function of the type of the air filter determined by the magnitude of the determined natural frequency.

19. A method of operating a vehicle air conditioning system having an air filter and an electric circuit section including a moisture sensor disposed at least one of on the air filter and in close proximity to the air filter, the method comprising the acts of:
 generating a signal from the electric circuit section; and
 determining both a moisture loading on the air filter and a type of air filter by way of an electronic device as a function of a magnitude of a signal property of the generated signal.

20. The method according to claim 19, wherein the type of air filter is assigned a predetermined range of values in which the signal property of the signal may lie.

21. The method according to claim 20, wherein the range of values are determined such that variations in the signal property induced by moisture changes when the air filter is operating under normal conditions are within the predetermined range of values.

22. The method according to 19, further comprising the acts of:
 determining an order of magnitude of a natural frequency of at least one of the moisture sensor and an electric circuit containing the moisture sensor by way of the electronic device; and
 determining from the order of magnitude of the natural frequency the type of air filter.

23. The method according to claim 19, further comprising the acts of:
 monitoring, by way of the electronic device, at least one of a time rate of change of the signal and a signal property of the signal; and
 controlling and/or regulating at least one functional parameter of the vehicle air conditioning system as a function of the monitoring.

* * * * *